United States Patent [19]

Koch, deceased et al.

[11] Patent Number: 4,838,014
[45] Date of Patent: Jun. 13, 1989

[54] DISC CUTTER ROTOR ASSEMBLY

[75] Inventors: Earl E. Koch, deceased, late of Mohnton, Pa., by Agnes E. Koch, legal representative; Franja F. Voler; Edmund O. Howell, both of New Holland, Pa.

[73] Assignee: Ford New Holland, Inc., New Holland, Pa.

[21] Appl. No.: 99,971

[22] Filed: Sep. 23, 1987

Related U.S. Application Data

[63] Continuation-in-part of Ser. No. 846,655, Mar. 31, 1986, abandoned.

[51] Int. Cl.⁴ .............................................. A01D 35/26
[52] U.S. Cl. ............................................ 56/13.6; 56/6
[58] Field of Search ................... 56/136, 6, 295, 255

[56] References Cited

U.S. PATENT DOCUMENTS

| | | | |
|---|---|---|---|
| 3,389,539 | 6/1968 | Zweegers | 56/6 |
| 4,157,004 | 6/1979 | Van der Lily | 56/13.6 |
| 4,253,294 | 3/1981 | Zweegers | 56/13.6 |
| 4,299,077 | 11/1981 | Wattron | 56/6 |
| 4,365,462 | 12/1982 | Werner et al. | 56/295 |
| 4,443,998 | 4/1984 | Neuerberg | 56/13.6 |
| 4,466,234 | 8/1984 | Sasaki | 56/6 |

Primary Examiner—John Weiss
Attorney, Agent, or Firm—Larry W. Miller; Frank A. Seemar; Darrell F. Marquette

[57] ABSTRACT

An improved disc cutter rotor assembly for use in a disc cutterbar of the type utilizing a plurality of intermeshed gears to transfer rotational power is disclosed wherein the rotor assembly provides a low profile to facilitate the flow of crop material over the cutterbar, yet permits the individual components of the rotor assembly to be serviced and/or replaced. The hub and shaft are of welded construction and are rotatably mounted within a bearing housing affixed to the transmission casing for mounting a removable bearing assembly. The drive gear for the rotor assembly is splined onto the shaft and retained in place by a fastener and washer assembly to permit the drive gear to be removed from the shaft. A sealed hole in the bottom of the transmission casing permits access to the fastener and washer assembly to permit the drive gear to be removed from the shaft before removing the rotor assembly from the transmission casing.

3 Claims, 5 Drawing Sheets

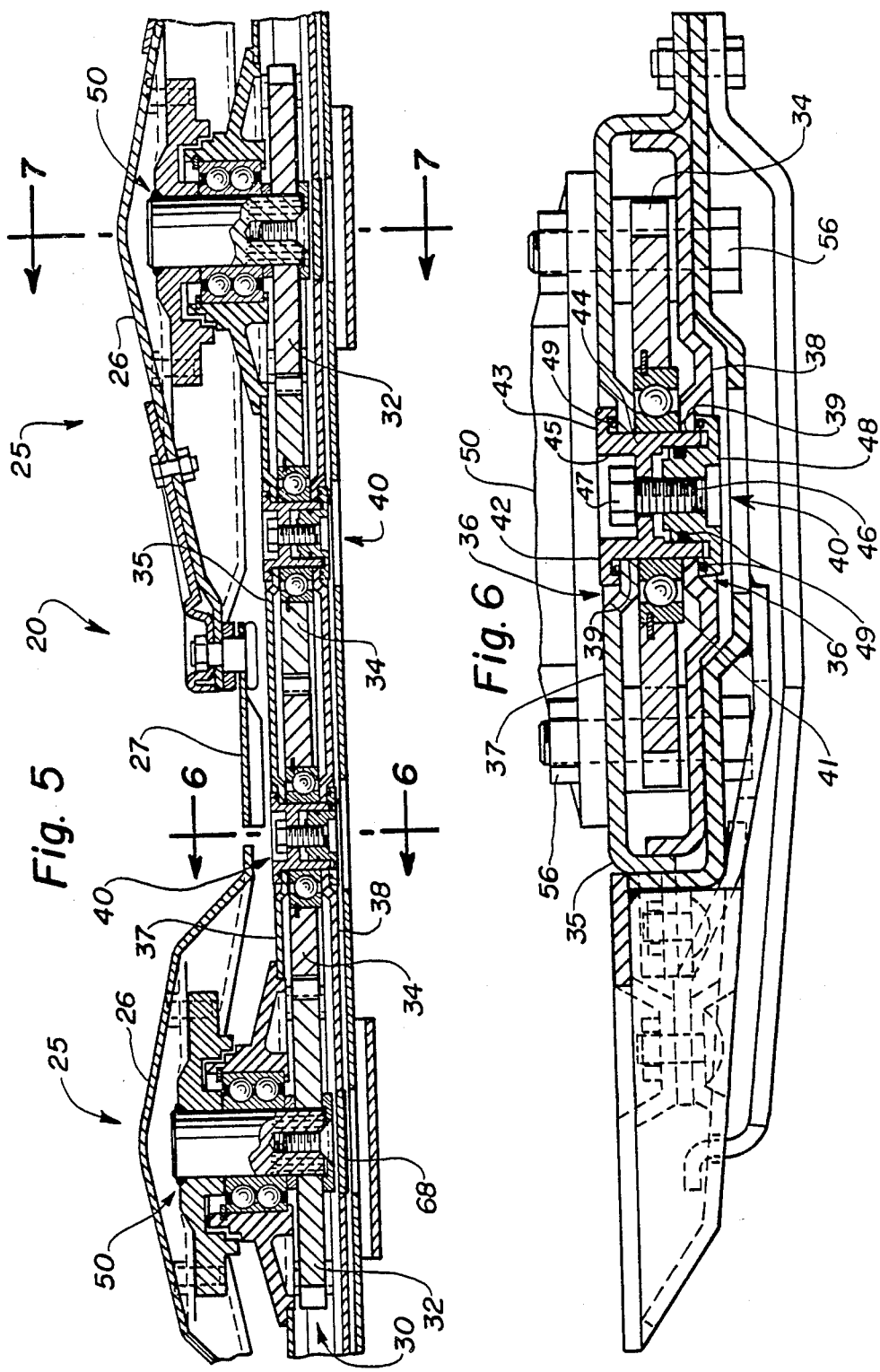

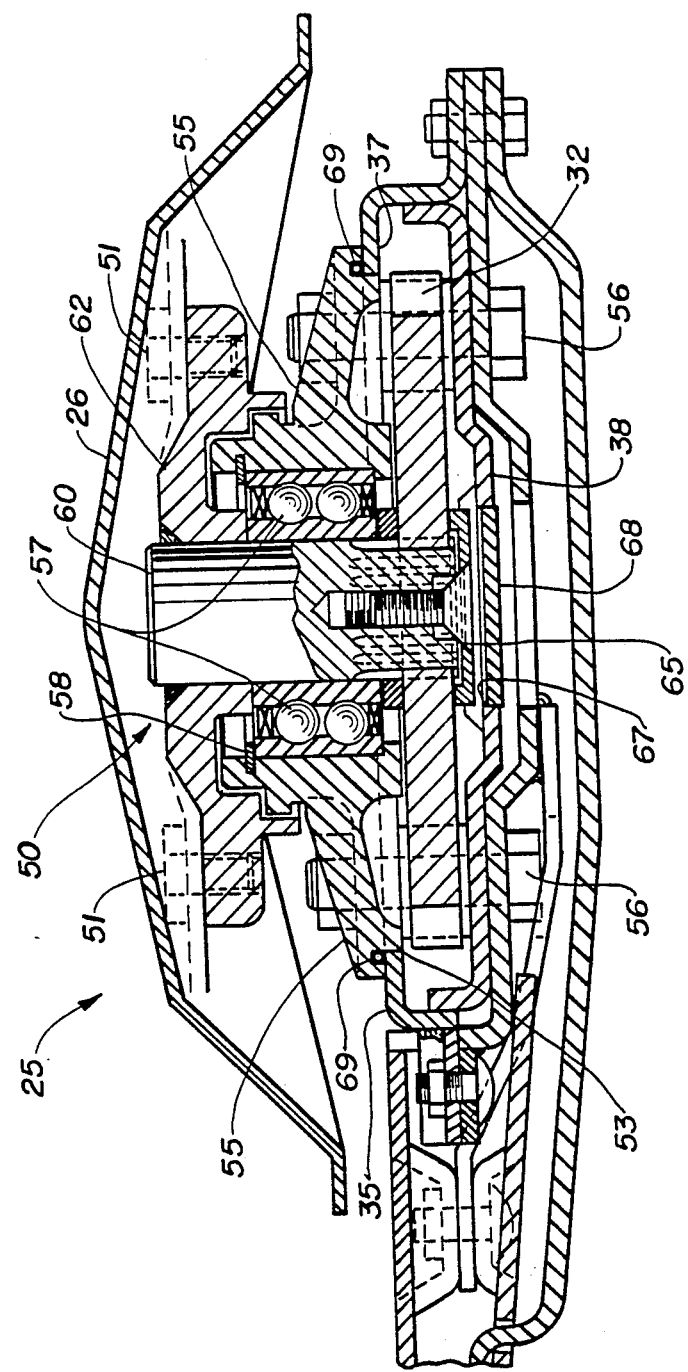

DISC CUTTER ROTOR ASSEMBLY

CROSS REFERENCE TO RELATED APPLICATIONS

This application is a continuation-in-part of U.S. patent application Ser. No. 846,655, filed Mar. 31, 1986 abandoned 1/27/88.

BACKGROUND OF THE INVENTION

The present invention relates generally to rotary mowers for severing standing crop material by impact action and, more particularly, to an improved disc cutter rotary assembly used in disc cutterbars of the type utilizing intermeshing gears for the transmission of rotary power.

The development of disc cutterbars has resulted in the provision of a low, compact drive profile so that the flow of severed crop material is not impeded over the surface of the cutterbar. Such a cutterbar construction can be found in U.S. Pat. No. 4,365,462, issued on Dec. 28, 1982. While this particular disc cutterbar configuration provides the compact profile, the rotor assembly is a captive unit whose individual components are neither serviceable nor removable from the assembly without causing damage to the other components.

Accordingly, it would be advantageous to provide a low, compact cutterbar profile while retaining the serviceability aspects of the individual components of the disc cutter rotor assembly.

SUMMARY OF THE INVENTION

It is an object of this invention to overcome the aforementioned disadvantages of the prior art by providing an improved disc cutter rotor assembly for use on a low profile disc cutterbar.

It is another object of this invention to permit the individual components of the disc cutter rotor assembly to be serviced and/or replaced as needed without damaging the remaining components of the assembly.

It is an advantage of this invention that serviceability of a low, compact disc cutterbar profile is enhanced.

It is another advantage of this invention that the ability to feed severed crop material over the upper surface of the disc cutterbar is not impeded.

It is a feature of this invention that the drive gear can be disconnected from the disc cutter rotor assembly before the assembly is removed from the disc cutterbar.

It is another feature of this invention that the bearing assembly for the disc cutter rotor assembly can be replaced without requiring replacement of the drive gear and other structural components of the rotor assembly.

It is yet another object of this invention to provide a disc cutter rotor assembly for use in a low profile disc cutterbar which is durable in construction, inexpensive of manufacture, carefree of maintenance, facile in assemblage and simple and effective in use.

These and other objects, features and advantages are accomplished according to the instant invention by providing an improved disc cutter rotor assembly for use in a disc cutterbar of the type utilizing a plurality of intermeshed gears to transfer rotational power wherein the rotor assembly provides a low profile to facilitate the flow of crop material over the cutterbar, yet permits the individual components of the rotor assembly to be serviced and/or replaced. The hub and shaft are of welded construction and are rotatably mounted within a bearing housing affixed to the transmission casing for mounting a removable bearing assembly. The drive gear for the rotor assembly is splined onto the shaft and retained in place by a fastener and washer assembly to permit the drive gear to be removed from the shaft. A sealed hole in the bottom of the transmission casing permits access to the fastener and washer assembly to permit the drive gear to be removed from the shaft before removing the rotor assembly from the transmission casing.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 5 is an enlarged partial cross-sectional view of the disc cutterbar taken along lines 5—5 of FIG. 4;

FIG. 6 is an enlarged cross-sectional view of the cutterbar taken along lines 6—6 of FIG. 5 to show the structural details of the idler gear mounting apparatus; and FIG. 7 is an enlarged partial cross-sectional view of the disc cutterbar taken along lines 7—7 of FIG. 5 to show the structural details of the disc cutter rotor assembly.

DETAILED DESCRIPTION OF THE PREFERRED EMBODIMENT

Figure 1:
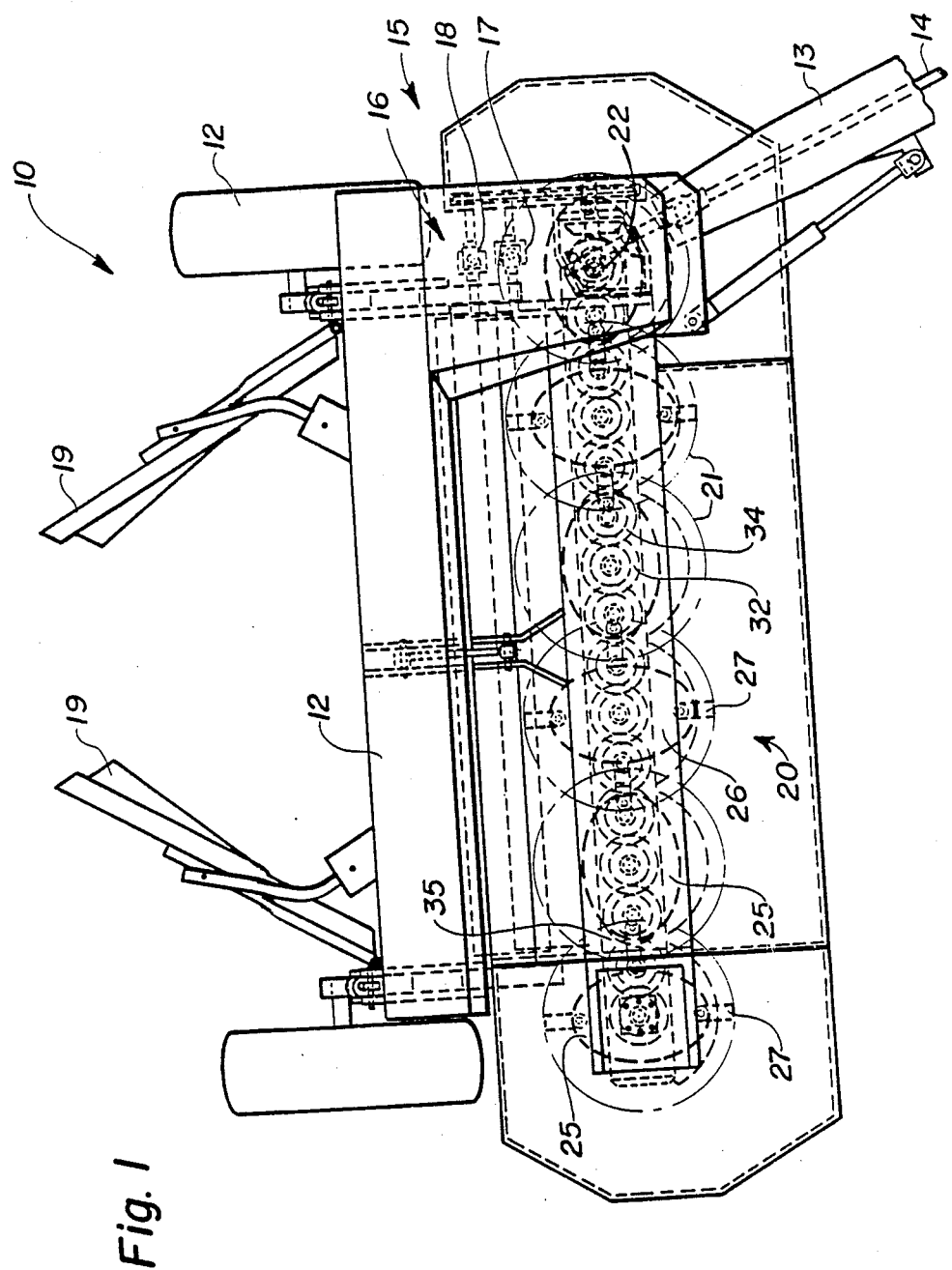
FIG. 1 is a top plan view of a disc mower-conditioner incorporating the principles of the instant invention.
Figure 2:
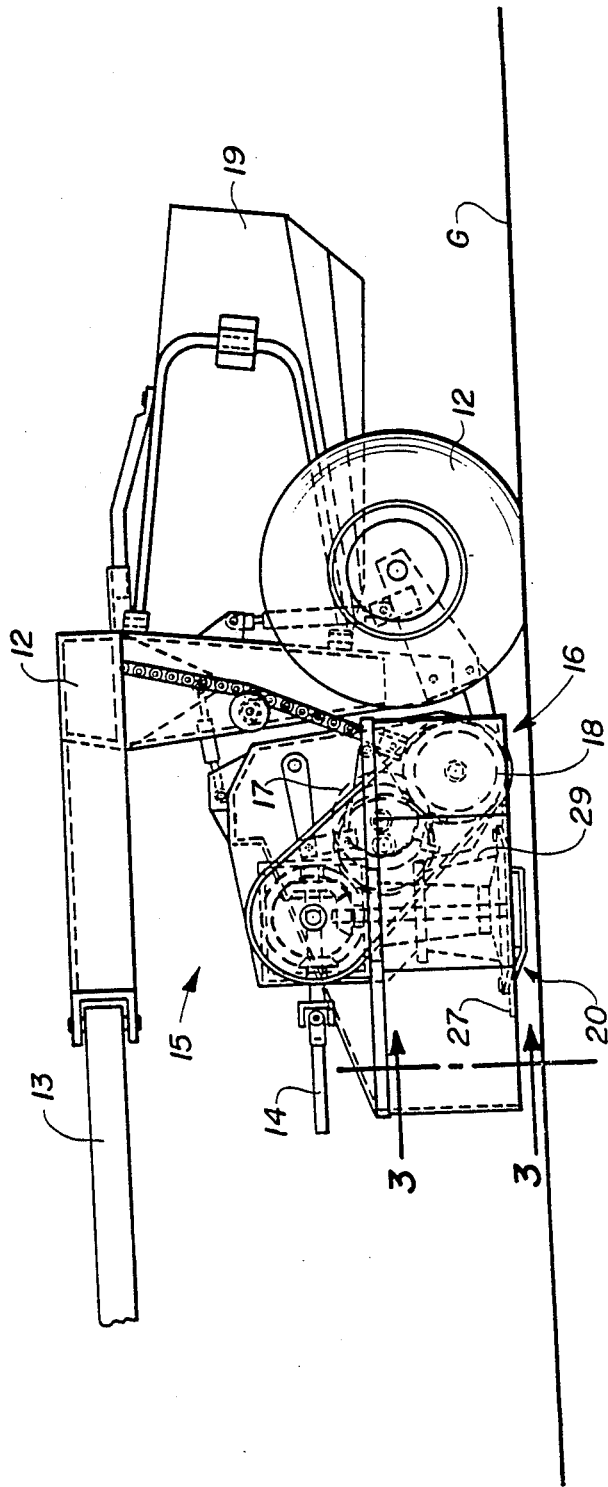
FIG. 2 is a left side elevational view of the disc mower-conditioner seen in FIG. 1.

Referring now to the drawings and, particularly, to FIG. 1, a top plan view of a crop harvesting machine, commonly referred to a disc mower-conditioner, incorporating the principles of the instant invention, can be seen. Any left and right references are used as a matter of convenience and are determined by standing at the rear of the machine, facing the forward end, the direction of travel. As best seen in FIGS. 1 and 2, the disc mower-conditioner 10 is supported over the ground G by a wheeled frame 12. The embodiment as shown in the drawings is commonly referred to as a pull-type machine and, therefore, is equipped with a draft tongue 13 and a PTO driveline 14 to input rotational power from a pulling tractor (not shown).

The machine 10 is provided with a header 15 floatingly supported from the frame 12 in a conventional manner. The header 15 is provided with a disc cutterbar 20, described in further detail below, and a conditioning mechanism 16, including an upper roll 17 and a lower roll 18, positioned immediately rearwardly of the cutterbar 20 to receive and condition severed crop. The discharge of conditioned crop material from the conditioning mechanism 16 is engaged with the rearwardly converging baffle shields 19 that deposit the conditioned crop into a consolidated windrow upon the ground G in a conventional manner.

Figure 3:
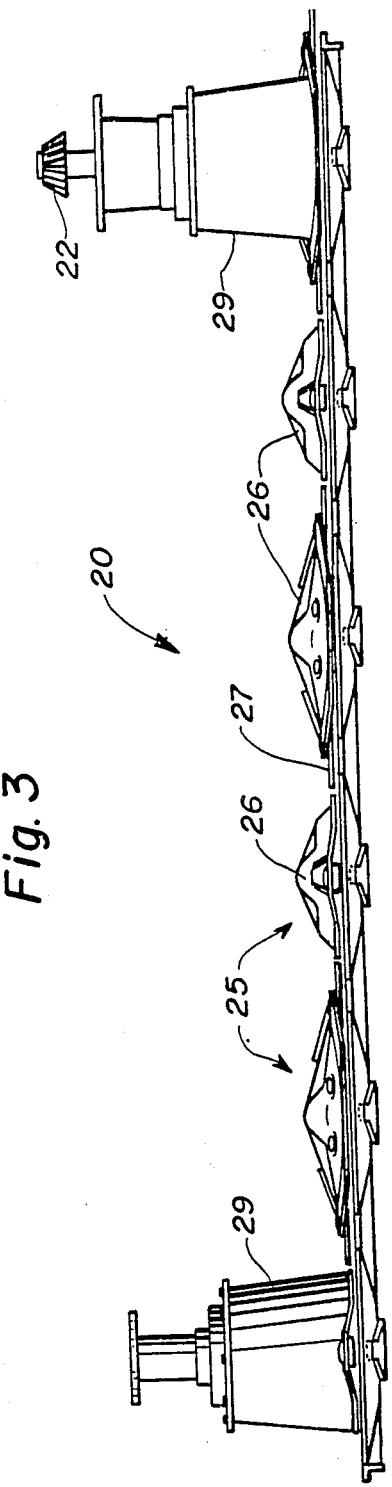
FIG. 3 is a view of the disc cutterbar as seen along lines 3—3 of FIG. 2, with the extraneous harvester structure removed.
Figure 4:
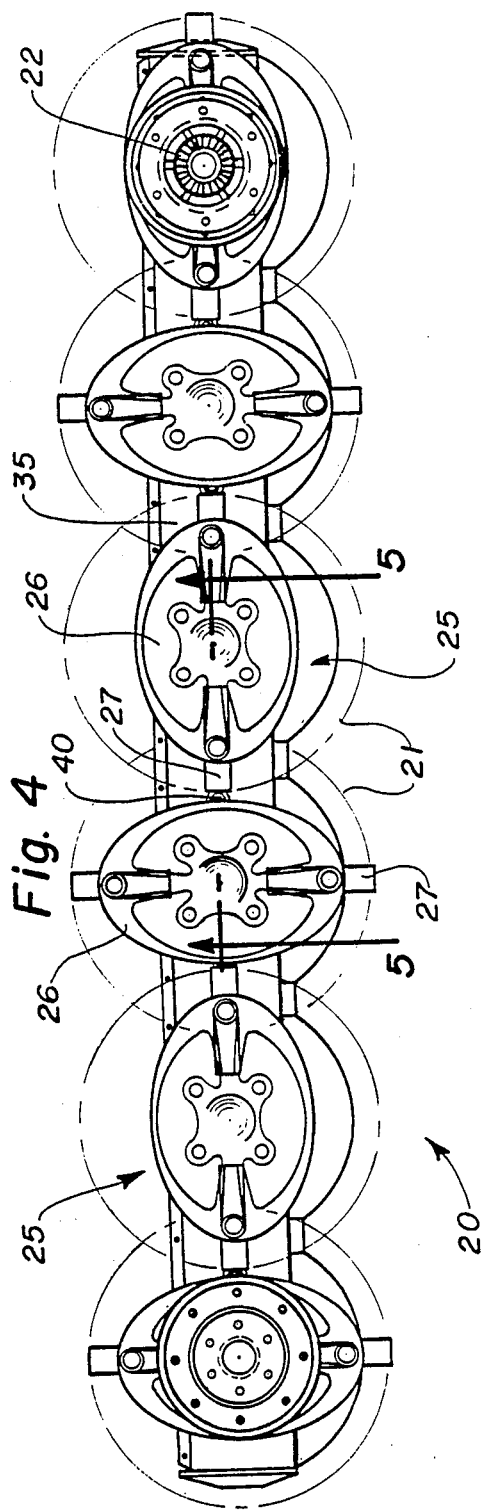
FIG. 4 is a top plan view of the disc cutterbar seen in FIG. 3.

An overall view of the disc cutterbar 20 is best seen in FIGS. 3 and 4. The power input shaft 22 receives rotational power from the PTO driveline 14 and transfers the rotational power through a series of intermeshing power transmission gears described in greater detail below and rotatably powers the operation of the disc cutter assemblies 25, each of which have a pair of outwardly extending knives 27 that engage the standing crop material and, by rotation along a circular arc exemplified arc 21, affects a severing thereof from the ground. The disc cutter assemblies 25 at the respective ends of the cutterbar 20 are provided with a hat-shaped divider drum 29 to facilitate the flow of crop material over the cutterbar 20 and inwardly toward the conditioning mechanism 16.

Referring now to FIGS. 3-5, particularly to FIG. 5, the structural details of the power transmission train 30 and the disc cutterbar 20 can best be seen. The description of the protective components of the disc cutterbar 20 is provided in greater detail in co-pending patent application entitled "Disc Cutterbar Construction", filed Mar. 31, 1986, and assigned Ser. No. 846,650. Each disc cutter assembly 25 is provided with a detachably connected disc cutter 26 which carries the knives 27 for engagement with the standing crop material. The power input shaft delivers rotational power to a series of transmission gears 30, including a drive gear 32 associated with each respective disc cutter assembly 25 and a pair of idler gears 34 mounted between adjacent drive gears 32. The provision of two idler gears 34 between adjacent drive gears 32 permits the adjacent disc cutter assemblies 25 to be rotated in opposing directions.

Referring now to FIGS. 5 and 6, the idler gear mounting apparatus 40 can best be seen. The transmission casing 35 is formed with an indentation 36 in both the upper surface portion 37 and the lower surface portion 38 through which the mounting hole passes. Each idler gear 34 is rotatably mounted on the apparatus 40 by a bearing assembly 41. The mounting apparatus includes a spacer member 42 having a lip portion 43 and a shank portion 44 defining a recessed portion 45. The spacer member 42 extends completely through the transmission casing 35 and engages both the upper surface portion 37 and the lower surface portion 38 along the shank portion 44 to provide radial support for the spacer member 42 and thus the mounting apparatus 40. The inner race of the bearing assembly 41 is mounted on the shank portion 44 of the spacer member 42 between the upper surface portion 37 and the lower surface portion 38.

To fix the mounting apparatus 40 in place on the transmission casing 35, a bolt 46 passes through the spacer member 42 such that the head portion 47 of the bolt 46 is received within the recessed portion 45 of the spacer member 42. A specially formed securing member 48 is threadably engaged with the bolt 46 to tightly draw the mounting apparatus 40 together. The securing member 48 engages the lower surface portion 38 of the transmission casing 35 while the lip portion 43 of the spacer member 42 engages the upper surface 37 of the transmission casing to permit the mounting apparatus 40 to squeeze the casing 35 against the bearing assembly 41. The special shape of the securing member 48 fits within the shank portion 44 of the spacer member 42 and extends outwardly thereof to engage the lower surface 38 of the casing 35. O-rings 49 positioned between the lip portion 43 and the upper surface portion 37, as well as between the securing member 48 and the lower surface portion 38 and between the securing member 48 and the shank portion 44 seal the idler gear mounting apparatus 40 against the transmission casing 35 to prevent the loss of fluid from within the casing 35.

Referring now to FIGS. 5 and 7, the structural configuration of the disc cutter assembly 25 can best be seen. The disc cutter members 26 are detachably mounted to a rotor assembly 50 by fasteners 51. The upper surface portion 37 of the transmission casing 35 is provided with an access opening 53 through which the rotor assembly 50 extends into the casing 35. The rotor assembly 50 includes a bearing housing 55 detachably mounted on the upper surface portion 37 of the casing 35 by a plurality of bolts 56 extending entirely through the transmission casing 35 and engaging the lower surface portion 38. The bearing housing 55 mounts a bearing assembly 57 which is removably secured by a snap ring 58 to retain the bearing assembly 57 in place with respect to the housing 55.

The bearing assembly 57 rotatably mounts a shaft member 60 for rotation relative to the bearing housing 55. The shaft 60 extends entirely through the bearing housing 55 and projects both above and below the bearing housing 55. A hub 62 is welded to the top of the shaft member 60 for rotation with the shaft 60 above the bearing housing 55. The disc member 26 is connected to the hub 62 by fasteners 51. The drive gear 32 for the disc cutter assembly 25 is splined onto the bottom of the shaft member 60 and positioned within the transmission casing 35 for intermeshed engagement with the adjoining idler transmission gears 34. The drive gear 32 is secured to the shaft member 60 by a fastener and washer assembly 65 which is threaded into the shaft member 60.

The lower surface portion 38 of the transmission casing 30 is provided with a hole 67 therein to gain access to the fastener and washer assembly 65 to permit a disconnection of the drive gear 32 from the shaft member 60 without removing the rotor assembly 50 from the transmission casing 35. The hole 67 is sealed with a seal 68 to maintain the fluid tight integrity of the transmission casing 35. An O-ring seal 69 is positioned between the bearing housing 55 and the upper surface portion 67 of the casing 35 to seal the access opening 53 and prevent leakage therefrom.

The component parts of the rotor assembly 50 can be assembled in the following manner. The bearing assembly 57 is first pressed into the bearing housing 55 and retained in place by the snap ring 58. After supporting the inner race of the bearing 57, the shaft member 60 is pressed through the inner race. The drive gear 32 can then be splined on to the shaft member 60 and retained in place by the fastener and washer assembly 65. Removal of the component parts from an assembled bar can be done by accessing the fastener and washer assembly 65 through the hole 67 and the drive gear 32 removed from the shaft member 60 before the rotor assembly 50 is removed from the casing 35. The bearing 57 can be replaced in the opposite manner from the assembly thereof as noted above.

In operation, the idler gear mounting apparatus 40 permits a stable, substantial mounting apparatus for the idler gear 34 while permitting an ease of serviceability to the bearings 41 and gear 34. The rotor assembly 50 permits the cutterbar 20 to retain a low, thin profile to facilitate the flow of severed crop material over the cutterbar 20, yet provides a disc cutter assembly 25 that can be easily serviced and permit replacement of any component part thereof. The drive gear 32 can be removed from the rotor assembly 50 without disturbing the relationship between the bearing assembly 57 and the shaft 60, which will advantageously improve serviceability under circumstances where the drive gear 32 fails. In such situations, the replacement of the drive gear 32 can be accomplished quickly and inexpensively because the bearings remain intact within he rotor housing 55. However, should other component parts of the rotor assembly 50 fail, such as the bearing assembly 57, the rotor assembly 50 can be disassembled, the failed component replaced and then the rotor assembly 50 reassembled and remounted on the transmission casing 35 for continued operation.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a disc cutterbar for severing standing crop material from the ground and having a plurality of disc cutter assemblies rotatably mounted on a transmission casing housing a plurality of intermeshed power transmission gears including a drive gear associated with each respective disc cutter assembly to effect rotation thereof and idler gears positioned between said drive gears to transfer rotational power between said drive gears, said transmission casing having an upper surface portion and a spaced apart lower surface portion, said upper surface portion having an opening therein corresponding to each said disc cutter assembly, an improved disc cutter assembly comprising:

a bearing housing detachably connectable to the upper surface of said transmission casing and having a size sufficient to cover said opening, said bearing housing mounting a bearing assembly having an outer race removably engaged with said bearing housing and an inner race;

a shaft member detachably engaged with the inner race of said bearing assembly and extending through said bearing housing, said shaft member being rotatably relative to said bearing housing and having an end extending beyond said bearing assembly and terminating within said transmission casing;

a hub affixed to said shaft member and rotatably therewith above said bearing housing;

a disc cutter detachably mounted on said hub for rotation therewith, said disc cutter carrying at least one knife to engage and sever standing crop material upon rotation of said disc cutter;

said drive gear being detachably connected to the end of said shaft member by a fastener and washer assembly positioned below said drive gear and being operatively interengaged with the other said power transmission gears to cause rotation of said shaft member, said drive gear being positioned within said transmission casing between said upper and lower surface portions and being selectively detachable from said shaft member without disengaging said bearing assembly from said shaft member; and the lower surface portion of said transmission casing including a hole positioned beneath said fastener and washer assembly to permit access to said fastener and washer assembly so that said drive gear can be disconnected from said shaft member before said bearing housing is removed from said transmission casing.

2. The disc cutterbar of claim 1 wherein said bearing assembly is retained within said bearing housing by a snap ring.

3. The disc cuttterbar of claim 2 wherein said bearing housing is connected to the upper surface portion of said transmission casing by bolts extending through said transmission casing for engagement with said lower surface portion.

* * * * *